Patented Aug. 17, 1948

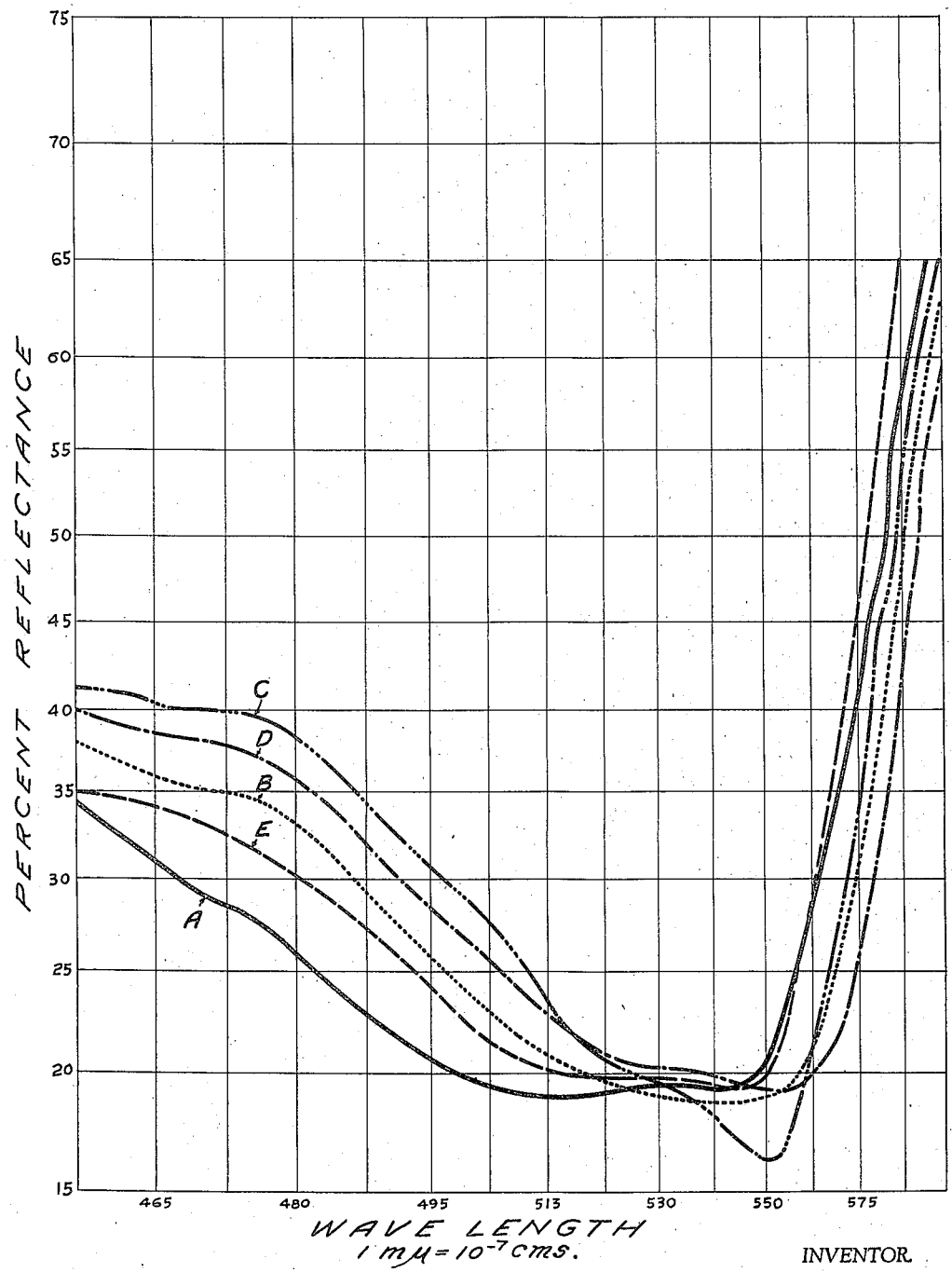

2,447,394

UNITED STATES PATENT OFFICE 2,447,394

PREPARATION OF A BARIUM LITHOL RED

Clifton C. Candee, Bound Brook, N. J., assignor to American Cyanamid Company, New York, N. Y., a corporation of Maine Application March 24, 1942, Serial No. 435,924

3 Claims. (Cl. 260—195)

This invention relates to preparation of a barium lithol red of an extreme yellow shade and to a new and improved method of producing the same.

Lithol red is usually an insoluble salt such as the calcium salt of the azo dye produced by diazotizing Tobias acid (2-naphthylamine-1-sulfonic acid) and coupling on $\beta$-naphthol. The color is used to a large extent in printing inks, coated paper, wall paper, paints and the like. However, for certain purposes the calcium salts possess a shade which is too blue. Modified lithol reds have been produced in which part of the Tobias acid is substituted by various aminoaryl sulfonic acids as for example 2-chlor-5-aminotoluene-4-sulfonic acid, or by replacing part of the $\beta$-naphthol with other coupling components such as phenylmethylpyrazolone. The products are yellower reds but have not produced either the brightness or strength desired.

A better yellow shade has also been produced by forming the sodium salts of modified lithols. However, these sodium salts are not particularly good when a high finish is desired and do not have as good color permanency as the calcium salts.

Barium lithols are very desirable in that they have greater color permanency than the sodium salts; permit a higher finish and are generally cheaper because of their higher color value per pound. Unfortunately, the barium salts have in the past, like the calcium salts, not been as yellow in shade as could be desired. Various deviations in the process have been tried in attempts to produce a barium lithol having a more pronouncedly yellow shade, but prior to the present invention it has proved impossible to so control the production of barium lithol reds as to produce the desired extreme yellow shade.

According to the present invention it has been found that if the barium salt is made under definite controlled conditions in the presence of the proper dispersing agents, it will consistently have the desired extreme yellow shade and permanency. When the process is carried out according to the present invention a much yellower shade is produced than was previously possible with any known variation in the procedure or combination of reagents. It is not known just what change in the chemical nature of the material causes the different shade and the present invention is not limited to any particular theory of action. It is my belief that the effect of the present process is to prevent conversion of the sodium salt to the normal and much bluer barium lithol and to promote the formation of an extreme yellow form.

The results obtainable by means of the present invention are illustrated by the drawing which shows a series of photometric analysis curves of a series of samples of which: A represents the product produced by the present invention; B, C, and D represent previously obtainable shades of barium lithol reds; and E represents pure sodium lithol red.

In general, the process comprises diazotizing Tobias acid; adding to it an alkaline solution containing $\beta$-naphthol and the dispersing agents; agitating the mixture to aid the coupling; adding barium salt solution; heating the mixture and finally precipitating and collecting the product. I have found that varying the proportions or conditions during this series of reactions produce different shades of red in the final product.

Particularly, I have found that seven factors have the most pronounced effect on the shade finally produced. These are: the alkaline balance during the reaction; the nature and amount of dispersing agents; the temperature at which the barium salt is added; the rate of heating after adding the barium salt; the final conversion temperature; the degree of agitation employed during the process and finally, the purity of the Tobias acid.

While each one of these variants has an affect on the final shade, I have found that if each of them is held within a certain limited range, the resultant product will have the extreme yellow shade. Thus, there are a number of possible combinations of the variants by means of which the desired result can be produced. It is important, however, that all of the factors be maintained within their own particular permissible ranges.

The alkali balance is not particularly critical. It must be maintained on the alkaline side but a pH range of about 7.5 to 10.5 is satisfactory. However, there should be present approximately 0.9 mol of alkali metal caustic or more per mol of $\beta$-naphthol. Any convenient alkaline reagent, for example sodium carbonate, may be used to bring the residual pH within the desired range.

The use of dispersing agents appears to be an important factor since the shade and brightness of the product depend to a large extent upon the particle size which is produced. I have found that in order to insure consistent results, a certain amount of alkali or alkaline earth metal lignin sulfonate should be present. Based upon the yield as a dry color, I have found that from about 4% to 12% produced good results. I have also found that the presence therewith of a different type of dispersing agent, such as a rosin soap, or similar resin acid soaps such as saponified talloel, are also useful. Another type of additional dispersant is Turkey-red oil and its derivatives. Based on the yield of dry color, approximately 10% to 30% of rosin soap or the like is satisfactory.

The strike temperature (temperature at which the barium salt is added to the diazotized and coupled acid) is not unduly critical. I have found that the strike temperature may be satisfactorily varied between about 100–170° F. The heating rate, however, is considerably more important. The reaction mixture should be heated at a rate of about 3–5° F. per minute, (or approximately twice the conventional rate) to retard formation of the normal blue shade and influence consistent production of the yellow shade.

The temperature to which the reaction mixture is carried is dependent upon the other conditions. In general, if the strike temperature is lower, the maximum temperature required to convert to a stable product should be lower, however, when the other factors are within the preferred range, a conversion temperature of 40° to 80° F. above the strike temperature will be adequate.

Agitation is an extremely important control. In general, as the efficiency of the agitation increases, the more difficult it becomes to produce the extreme yellow shade. On the other hand, if the agitation is too inefficient, incomplete coupling occurs, which is also detrimental. No more agitation should be used than is found necessary to produce the proper yield. I have found that the best results are obtained by using what is known to the trade as "medium" agitation which can be approximately reproduced in the laboratory by a 1 inch by 4 inch straight-blade stirrer rotating at approximately 250 R. P. M. in a standard 4 liter beaker.

As to the quality of the Tobias acid used, the reaction is not so critical. However, when an appreciable quantity of foreign materials are found in the acid, the control becomes exceedingly difficult. Therefore, in order to insure the best results from care with the other controls, as pure a form of Tobias acid as is commercially obtainable should be used.

The invention will be described in greater detail in conjunction with the following example which is meant to illustrate but not limit the invention. Parts are by weight unless otherwise noted.

*Example*

9 parts of Tobias acid were wet with about 50 parts of water. Approximately 18 parts of a 10% sodium hydroxide solution was added and the acid completely dissolved by the aid of mechanical stirring while holding the temperature below 140° F. The temperature was then reduced to 32° F. with a large excess of ice, after which 28 parts of 10% sodium nitrite solution were added, followed closely by 12 parts of 20° Bé., HCl. The temperature was held at 32° F. and 10 minutes allowed for completion of the diazotization.

Concurrently, a coupling solution was prepared by dissolving 6 parts of β-naphthol in 25 parts of a 10% NaOH solution and adding thereto 7½ parts of a 10% $Na_2CO_3$ solution and 50 parts of water. The β-naphthol was dissolved by heating to 200° F., with mechanical agitation. A dispersing agent solution was also prepared containing 400 parts of water, 2 parts of sodium lignin sulfonate and 80 parts of a 5% rosin soap solution. The rosin soap solution was made previously by boiling about 40 parts of wood rosin for about 20 minutes in 800 parts of water containing 7½ parts of NaOH and 1½ parts of $Na_2CO_3$. The β-naphthol solution and the dispersing agent solution were mixed, iced to 55° F., and the diazotized material added slowly over about four minutes. A one hour period was allowed for the coupling to take place. At the end of this period 100 parts of a 10% $BaCl_2.2H_2O$ solution were added and the mixture heated at a rate of 3° F. per minute to 180° F., which temperature was held for 15 minutes. The mixture was flooded to 100° F. and the product filtered and washed free from excess barium with water. The precipitate was dried at about 120° F., to a moisture content of 4½%.

That this product is a barium salt and not a mixture of barium and sodium salts is shown by the fact that the final product analyzed 18.5% barium and 0.0% sodium. This checks closely with the theoretical barium content of 19.3%, since the presence of a certain amount of moisture in the precipitated color precludes a more accurate determination.

The color characteristics of the product obtained in this example are shown in the drawing as curve A. That it differs from any previously known barium lithol is shown by comparison with curves B, C and D, each of which represents the color characteristics of the best obtainable samples of previously known types of barium lithols. Curve A is definitely lower on the blue end of the curve and higher on the red than any of the others indicating a much yellower shade. It is also to be noted that curve A is lower in the blue range than the sodium lithol, represented by curve E, and therefore appears more yellow in shade even than the sodium salt.

While the exact cause of the more yellow shade is not fully known, it appears to be due to a different physical state of the material. Extraction tests as well as examination of the X-ray diffraction patterns indicate that both color forms are mixtures of chemically similar components. Extended heating of the extreme yellow-shade form causes it to assume color characteristics similar to those of the blue-shade form.

I claim:

1. In a process of producing an extreme yellow shade of barium lithol red, the steps which comprise carrying out the coupling of diazotized Tobias acid and beta-naphthol in the presence of a dispersing agent selected from the group consisting of the alkali and alkaline-earth metal lignin sulfonates and at least one other dispersing agent, adding a solution of a barium salt at a strike temperature of from about 100–170° F., increasing the temperature of the mixture at from about 3–5° F. per minute to a conversion temperature of from about 40–80° F. above the temperature of the strike, holding the mixture at the conversion temperature until the reaction is substantially complete and maintaining the pH of from about 7.6 to 10.5 of the reaction mixture throughout the process.

2. In a process of producing an extreme yellow shade of barium lithol red, the steps which comprise carrying out the coupling of diazotized Tobias acid and beta-naphthol in the presence of a dispersing agent selected from the group consisting of the alkali and alkaline-earth metal lignin sulfonates and at least one other dispersing agent, adding a solution of a barium salt at a strike temperature of from about 100–170° F., increasing the temperature of the mixture at from about 3–5° F. per minute to a conversion temperature of from about 40–80° F. above the temperature of the strike, holding the mixture at the conversion temperature until the reaction is substantially complete, subjecting the mixture to a medium agitation during the heating and conversion steps and maintaining the pH of the reaction mixture at from about 7.6 to 10.5 throughout the process.

3. In a process of producing an extreme yellow shade of barium lithol red, the steps which comprise carrying out the coupling of diazotized Tobias acid and beta-naphthol in a solution comprising about 10–30% of rosin soap and about 4–12% of a 35% solution of an alkali lignin sulfonate, adding a solution of barium salt at a strike temperature of from about 100–170° F., increasing the temperature of the mixture at from about 3–5° F. per minute to a conversion temperature of from about 40–80° F. above the temperature of the strike, holding the mixture at the conversion temperature until the reaction is substantially complete, maintaining the pH of the reaction mixture at from about 7.6 to 10.5 throughout the process and subjecting the mixture to a medium agitation during the heating and conversion steps.

CLIFTON C. CANDEE.

REFERENCES CITED

The following references are of record in the file of this patent:

UNITED STATES PATENTS

| Number | Name | Date |
| --- | --- | --- |
| 1,820,540 | Martone | Aug. 25, 1931 |
| 2,168,888 | Siegel | Aug. 8, 1939 |
| 2,237,768 | Scudi | Apr. 8, 1941 |

FOREIGN PATENTS

| Number | Country | Date |
| --- | --- | --- |
| 251,266 | Great Britain | June 24, 1926 |